United States Patent

Ashihara

[11] Patent Number: 5,864,314
[45] Date of Patent: Jan. 26, 1999

[54] FM RADAR SYSTEM

[75] Inventor: Jun Ashihara, Wako, Japan

[73] Assignee: Honda Giken Kogyo Kabushiki Kaisha, Tokyo, Japan

[21] Appl. No.: 970,569

[22] Filed: Nov. 14, 1997

[30] Foreign Application Priority Data

Nov. 15, 1996  [JP]  Japan .................................. 8-305037

[51] Int. Cl.⁶ .................................................. G01S 13/34
[52] U.S. Cl. .......................................................... 342/128
[58] Field of Search .................................. 342/128, 118, 342/109, 70, 192

[56] References Cited

U.S. PATENT DOCUMENTS 5,448,244  9/1995  Komatsu et al. ........................... 342/70
5,483,242  1/1996  Grein et al. .............................. 342/128

FOREIGN PATENT DOCUMENTS

4-142486 (A)   5/1992  Japan .
5-142337 (A)   6/1993  Japan .
5-150035 (A)   6/1993  Japan .
5-180931(A)    7/1993  Japan .
6-242330 (A)   9/1994  Japan .
07-128440 A    5/1995  Japan .
8-21145 A      8/1996  Japan .

Primary Examiner—Daniel T. Pihulic
Attorney, Agent, or Firm—Lyon & Lyon LLP

[57] ABSTRACT

An FM radar system includes an amplifier for amplifying the beat signal at an amplification factor varying with the frequency, and a level correcting device for correcting a spectrum level of an amplified signal or a spectrum level of a signal generated based on the amplified signal, into a spectrum level obtained when the beat signal is amplified without involving Doppler shift caused by a velocity of the target relative to the FM radar system. By virtue of the correction performed by the level correcting device, it becomes possible to obtain a real spectrum level which is observed when the target is stationary or fixed in position relative to the radar system.

10 Claims, 9 Drawing Sheets

| CHANNEL | fc (MHz) | fs (MHz) | L (m) |
|---|---|---|---|
| 1 | 57.466 | 0.267~0.534 | 1~2 |
| 2 | 57.199 | 0.534~0.801 | 2~3 |
| 3 | 56.932 | 0.801~1.068 | 3~4 |
| ⋮ | ⋮ | ⋮ | ⋮ |
| ⋮ | ⋮ | ⋮ | ⋮ |
| 97 | 31.834 | 25.899~26.166 | 97~98 |
| 98 | 31.567 | 26.166~26.433 | 98~99 |
| 99 | 31.3 | 26.433~26.7 | 99~100 |

FM RADAR SYSTEM

BACKGROUND OF THE INVENTION

1. Field of the Invention

The present invention relates generally to frequency-modulated (FM) radar systems for detecting the position of an object or target, and more particularly to such an FM radar system which is particularly suitable for the detection of the position of a target moving at high speeds.

2. Description of the Related Art

FM radar systems are known, which are designed to transmit a frequency modulated (FM) signal while receiving a signal reflected by the object so as to detect an object or target based on a beat signal obtained by mixing the received signal and a signal related to the transmitted signal. The known FM radar systems are disclosed, for example, in Japanese Patent Laid-open Publications Nos. HEI 4-142486, HEI 5-150035, HEI 5-180931, HEI 6-242230, HEI 7-128440 and HEI 8-211145.

In the FM radar system disclosed in Japanese Patent Laid-open Publication No. HEI 5-180931, a beat signal is detected after amplification by an amplifier whose amplification factor varies in proportion to the frequency. The amplifier may have a gain varying as the fourth power of the frequency. This publication also discloses a method in which a direction to the target is detected from the F-θ characteristic on the basis of a spectrum level of the detected signal.

In cases where the target is stationary or fixed in position relative to the FM radar system, the frequency of the beat signal has a value corresponding to a range or distance to the target (i.e., a value proportional to a relative distance between the radar system and the target). However, in the case where there is a relative velocity between the target and a movable body, such as a vehicle or an airplane on which the FM radar system is mounted, and particularly when the target is moving at high speeds relative to the FM radar system, the frequency of the beat signal tends to deviate to some extent from a value corresponding to the real distance (relative distance) to the target due to the Doppler shift or the change in observed frequency of a received signal.

In the case where the beat signal is set to be amplified with a particular amplification factor varying with the frequency, the Doppler shift causes the amplification of the beat signal to be actually executed with a different amplification factor which does not correspond to a real frequency. The amplified signal eventually has a spectrum level somewhat deviated from the real spectrum level.

Especially, in the case where the amplification is set to be taken with an amplification factor varying to such a greater extent as equal the fourth power of the frequency, and when the target is moving at high speeds, the Doppler shift causes a frequency shifting which will make the amplification take place with an amplification factor proportional to the fourth power of the deviated frequency. As a result, the spectrum level of the amplified signal becomes greatly deviated from the real spectrum level. Under these circumstances, the direction to the target, which is detected on the basis of the spectrum level of the amplified signal, is greatly deviated from the real direction.

The FM radar system disclosed in Japanese Patent Laid-open Publication No. HEI 7-128440 includes: a frequency analyzing means or analyzer for analyzing the frequency of a beat signal to obtain a spectral distribution at every unit frequency interval of the beat signal; a maximum spectrum detecting means or detector for determining from the spectral distribution, the frequency of a maximum spectrum at which the spectrum level takes a maximum value above a predetermined level; a level centroid detecting means or detector for determining the frequency at the level centroid of the spectral distribution within a predetermined frequency width through the front and the rear of the maximum spectrum; and a distance detecting means or detector for determining a relative distance of a target on the basis of the frequency of the level centroid which is a frequency corresponding to the relative distance of the object.

Detection of the maximum spectrum is accomplished by detecting a spectrum which has a spectrum level larger than the predetermined level and which is located between two spectrums at adjacent frequency bands whose spectrum levels each indicate a change from the upward inclination to the downward inclination when viewed from the central spectrum.

Japanese Patent Laid-open Publication No. HEI 7-128440 also shows a modified radar system wherein data on the relative distance of a target and data on the radiating direction of a beam are paired to determine the position of a two-dimensional level centroid, and the determined two-dimensional level centroid position is taken to be a two-dimensional relative position of the target.

The radar systems disclosed in Japanese Patent Laid-open Publication No. HEI 7-128440 operate generally satisfactorily, however, there is a limit in ability to detect the position of the target with high accuracy because the effect of the Doppler shift is not taken into consideration.

SUMMARY OF THE INVENTION

With the foregoing drawbacks in view, it is an object of the present invention to provide an FM radar system which is capable of accurately detecting the position of an object or target even when the target is moving at high speeds relative to the FM radar system.

An FM radar system according to the present invention comprises an amplifier for amplifying the beat signal at an amplification factor varying with the frequency, and means for correcting a spectrum level of an amplified signal from the amplifier or a spectrum level of a signal generated based on the amplified signal, into a spectrum level obtained when the beat signal is amplified without involving Doppler shift caused by a velocity of the target relative to the FM radar system, thus enabling the detection of the position of the target to be performed on the basis of the spectrum level corrected by the correcting means.

Since the spectrum level of the amplified signal or the spectrum level of the signal generated based on the amplified signal is corrected to the spectrum level obtained when the beat signal is amplified without involving Doppler shift caused due to the velocity of the target relative to the FM radar system, it becomes possible to obtain a real spectrum level observed when the target is stationary or fixed in position relative to the FM radar system.

By the detection performed on the basis of the corrected spectrum level, the position of the target is detected with improved accuracy.

In a preferred form of the FM radar system, the amplifier amplifies the beat signal with an amplification factor which is proportional to the fourth power of the frequency.

By virtue of the amplification of the beat signal which is performed, in consideration of a radar equation, by the amplifier having a gain characteristic proportional to the fourth power of the frequency, it is possible to compensate for deterioration of the reflected signal reception level and a decrease in the beat signal level resulting therefrom (this compensation is referred to as "range (distance) attenuation compensation").

Even though the amplifier having such a high amplification factor or gain as being proportional to the fourth power of the frequency is used to amplify the beat signal, the subsequent correction in the spectrum level of the amplified signal makes it possible to neglect the influence of a change in amplification factor caused by frequency departure resulting from the Doppler shift. By the correction of the spectrum level, it is possible to obtain a spectrum level of a real amplified signal or a signal generated based on the real amplified signal.

In one preferred form of the invention, the FM radar system is an FM-CW radar system which radiates an FM signal frequency-modulated by a triangular wave. The correcting means operates to a spectrum level at which the spectrum level of the amplified signal from the amplifier or the spectrum level of the signal generated based on the amplified signal forms a peak in a frequency rise section or a frequency fall section of the FM signal, into the spectrum level obtained when the beat signal is amplified without involving Doppler shift, on the basis of an amplification factor of the amplifier at a frequency of the peak and an amplification factor of the amplifier at a mean value of two peak frequencies in the frequency rise section and the frequency fall section.

In the FM-CW radar system designed to radiate an FM signal frequency-modulated by the triangular wave, a real frequency corresponding to a relative range or distance to the target can easily be determined by calculating a mean value between the peak frequency in the frequency rise section and the peak frequency in the frequency fall section.

Since peak spectrum level is corrected into the real spectrum level on the basis of the amplification factor at the peak frequency and the amplification factor at the real frequency, this correction can be performed using a simple arithmetic operation, such as the division in which the spectrum level is divided by the above-mentioned ratio of the two amplification factors, or the multiplication in which the spectrum level is multiplied by the reciprocal of the above-mentioned ratio of the two amplification factors.

With this correction performed by the simple arithmetic operation, the radar system is able to quickly notify the position of a detected target to the operator of an automobile, for example, on which the radar system is mounted, even when the target is moving at high speeds.

The correcting means is preferably operative to correct the spectrum level of the amplified signal from the amplifier or the spectrum level of the signal generated based on the amplified signal into the spectrum level obtained when the beat signal is amplified without involving Doppler shift caused due to the velocity of the target, after any noise component involved in the beat signal is removed.

The noise component caused due to road surface reflection or clutter is previously determined by experiments and it is removed before the correction is performed. Thus, the corrected spectrum level is in accurate correspondence to the target, thus securing a highly accurate detection of the direction to the target moving at high speeds.

The FM radar system may be constructed to radiate at least two beams successively in an overlapping state. In this instance, the radar system detects a direction to the target on the basis of spectrum levels of respective amplified signals obtained when the two beams are successively radiated in the overlapping state or spectrum levels of respective signal generated based on the amplified signals.

The above and other objects, features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Certain preferred embodiments of the present invention will be described below in greater detail with reference to the accompanying drawings, wherein like reference characters designate like or corresponding parts throughout several views.

Figure 2:
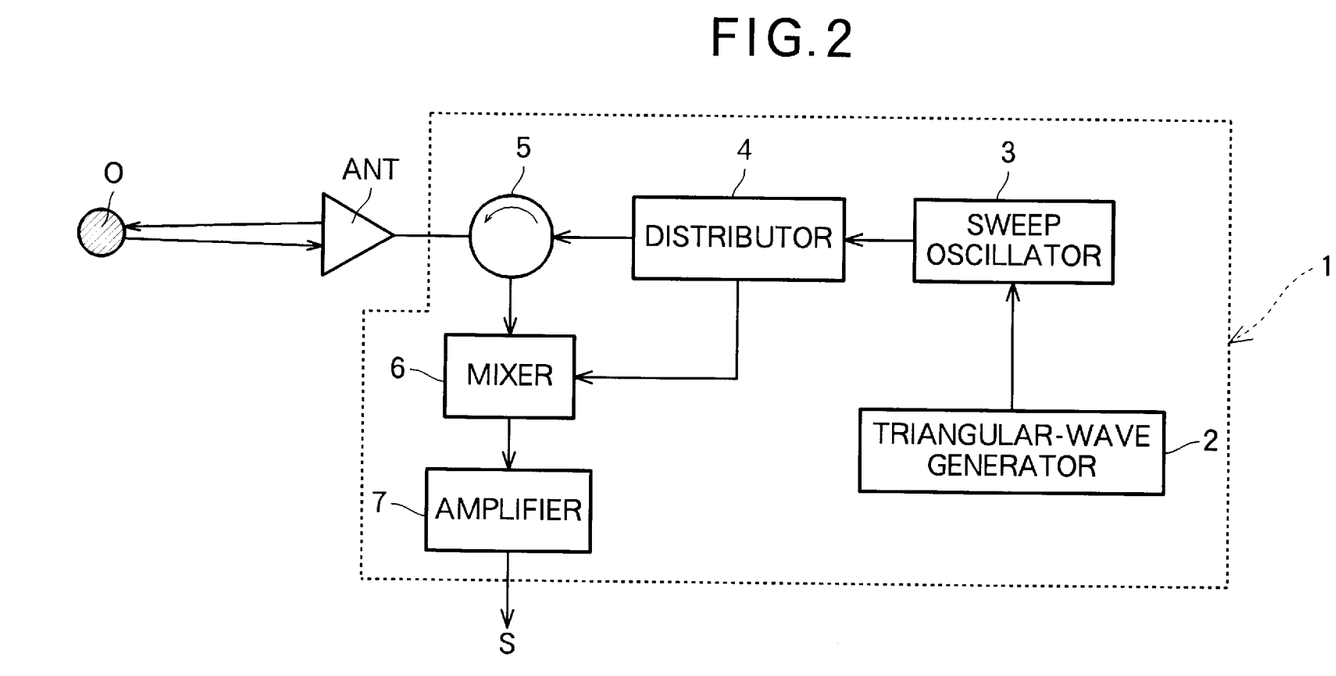
FIG. 2 is a block diagram showing the general construction of a body of the radar system according to the present invention.

FIG. 2 shows the general construction of a body 1 of an FM radar system according to the present invention. The FM radar system body 1 is constructed such that a carrier wave from a triangular wave generating circuit or generator 2 is supplied to a sweep oscillator 3 from which an FM signal having a predetermined sweep frequency is supplied through a distributor 4 to a circulator 5 and, subsequently, this signal is radiated in the form of a radio wave from an antenna ANT toward an object or target O.

A wave reflected by the target O is received by the antenna ANT and then is supplied through the circulator 5 to a mixer 6 where the reflected wave is mixed with the radiated wave to thereby generate a beat signal based on a difference in frequency between these two waves which is proportional to a relative range or distance between the target O and the FM radar system body 1. The beat signal is supplied to an amplifier 7 which has a gain characteristic proportional to the fourth power of the frequency. The amplifier 7 has a function to execute the so-called "range attenuation compensation" which compensates for deterioration of the reflected signal reception level and a decrease in the beat signal level resulting therefrom which would otherwise be increased as the range or distance to the target increases. The amplified signal S is taken out from the amplifier as a range (distance) signal S related to the target O detected at that time.

The range signal S is frequency-analyzed using a frequency analyzer which may be comprised of a group of bandpass filters (BPFs), such as those $8_1$–$8n$ shown in FIGS. 4 and 10 described later, or an arithmetic unit capable of performing a suitable arithmetic operation process such as the fast Fourier transform (FFT). With this frequency analysis, a spectral distribution of the range signal S is obtained. The fast Fourier transform (FFT) may be performed by a fast Fourier transformer or a microcomputer.

Now considering that the range signal S is subjected to the analog-to-digital conversion and subsequently inputted, through a fast Fourier transformer, into a microcomputer (such as the one 11 shown in FIGS. 1, 4 and 10) for various arithmetic operations performed therein (the digitized range signal S may be directly inputted in the microcomputer 11 in which instance it is subjected to the fast Fourier transform performed in the microcomputer 11), a spectral distribution of the range signal S can be obtained through the fast Fourier transform.

The microcomputer 11 includes a level correcting means or device 20 (FIGS. 1, 4 and 10) for correcting a spectrum level of the range signal (amplified signal) from the amplifier or a spectrum level of a signal generated based on the amplified signal into a spectrum level obtained when the beat signal is amplified without involving Doppler shift caused by a velocity of the target relative to the FM radar system.

Figure 12A:
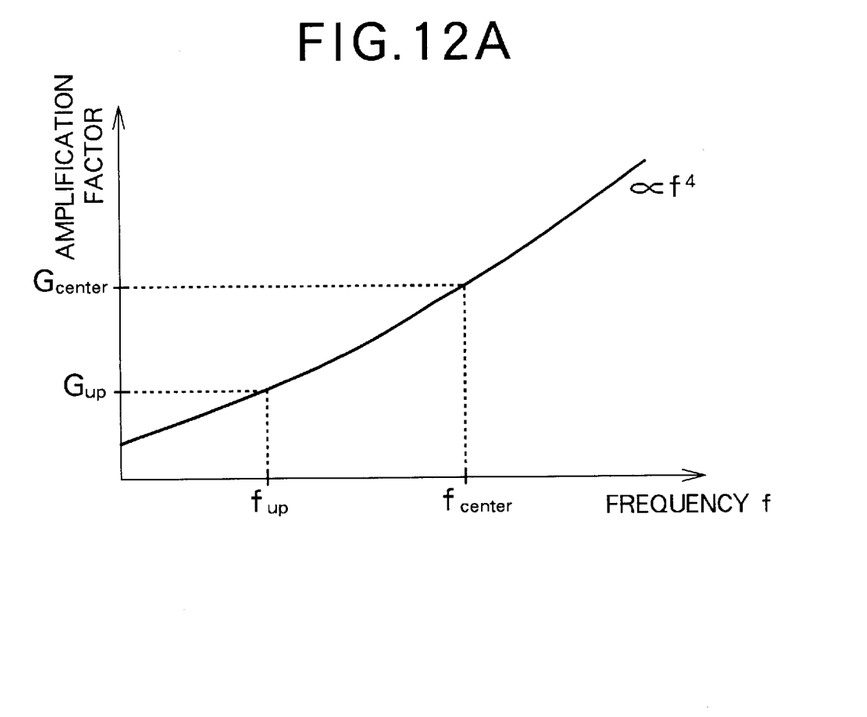
FIGS. 12A and 12B are graphs illustrative of the manner in which the spectrum level of an amplified signal is corrected.
Figure 12B:
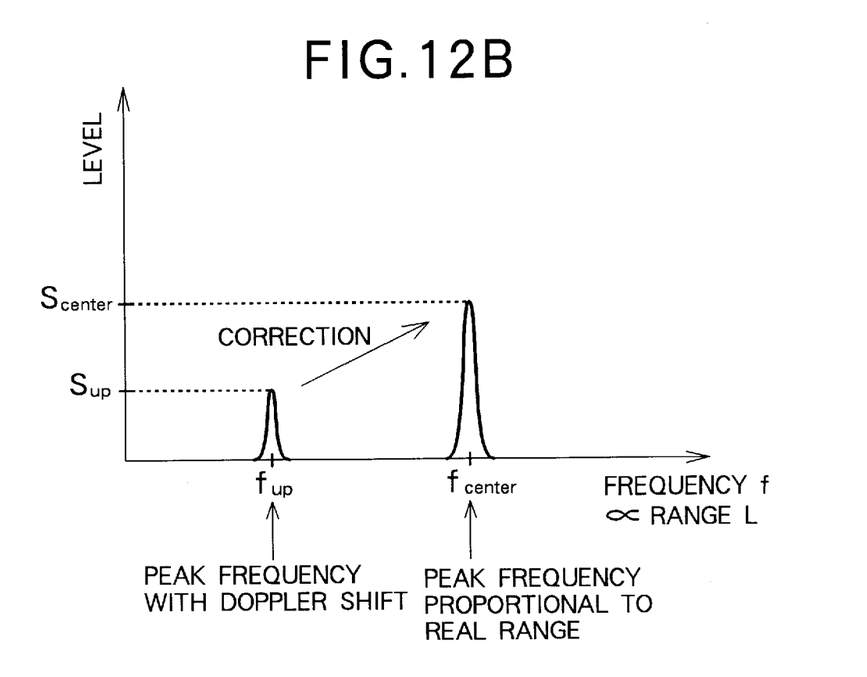

FIGS. 12A and 12B are graphs illustrative of the manner in which the spectrum level of the amplified signal is corrected by the level correcting means 20. FIG. 12A shows the frequency characteristic of an amplification factor (or gain) of the amplifier 7, and FIG. 12B shows two different spectrum levels of the amplified signal obtained respectively before and after the correction is made. In the illustrated embodiment, the target is becoming more distant from the FM radar system body 1 (FIG. 2).

The level correcting means 20 is preferably so designed as to correct a spectrum level $S_{up}$ of the range signal (amplified signal) S which is a peak in a frequency rise side or section of the FM signal, into a spectrum level $S_{center}$ obtained when the beat signal is amplified with no Doppler shift involved therein, on the basis of the ratio of an amplification factor or gain $G_{up}$ of the amplifier 7 at a peak frequency $f_{up}$ of the peak spectrum level to an amplification factor or gain $G_{center}$ of the amplifier 7 at a mean value $f_{center}$ of the peak frequency $f_{up}$ in the frequency rise section and a peak frequency of the range signal S in a frequency fall side or section of the FM signal.

The spectrum level $S_{center}$ can be calculated by the equation: $S_{center}=S_{up} \times G_{center}/G_{up}$. It may be obtained by the equation: $S_{center}=S_{up} \times (f_{center}/f_{up})^4$.

As an alternative, the level correcting means 20 associated with the microcomputer 11 may correct a spectrum level $S_{down}$ of the range signal (amplified signal) S which forms a peak in the frequency fall section of the FM signal, into a spectrum level $S_{center}$ obtained when the beat signal is amplified with no Doppler shift involved therein, on the basis of the ratio of an amplification factor or gain $G_{down}$ of the amplifier 7 at the peak frequency $f_{down}$ of the peak spectrum level to an amplification factor or gain $G_{center}$ of the amplifier 7 at a mean value $f_{center}$ of a peak frequency $f_{up}$ in the frequency rise section and the peak frequency $f_{down}$ of the range signal S in the frequency fall section of the FM signal. The spectrum level $S_{down}$, the amplification factor $G_{down}$ and the peak frequency $f_{down}$ are not shown in FIGS. 12A and 12B as they can readily be understood from the foregoing description given in conjunction with the correction of the spectrum level in the frequency rise section of the FM signal.

The spectrum level $S_{center}$ can be calculated by the equation: $S_{center}=S_{down} \times G_{center}/G_{down}$. As an alternative, it may be obtained by the equation: $S_{center}=S_{down} \times (f_{center}/f_{down})^4$.

The foregoing calculation may be performed by using logarithm. The frequency characteristic of the amplification factor of the amplifier 7 may be previously stored in an internal memory of the microcomputer 11.

The mean frequency value $f_{center}$ is represented by the equation: $f_{center}=(f_{up}+f_{down})/2$. By obtaining the mean frequency value $f_{center}$ of the two peak frequencies in the frequency rise side and descending side, it becomes possible to calculate a real frequency corresponding to a relative range (distance) to the target in such a condition completely free from the Doppler shift. Based on the thus calculated frequency, the actual range (distance) to the target can be obtained.

In addition, since the Doppler frequency $f_{dpr}$ is expressed by the equation: $f_{dpr}=(f_{up}-f_{down})/2$, it is possible to calculate a frequency proportional to a relative velocity of the target. The relative velocity can, therefore, be obtained based on the calculated frequency.

The level correcting means 20 may be hardware of the microcomputer 11, software with a control program stored in the internal memory of the microcomputer 11, or a digital signal processor (DSP) capable of performing complicated arithmetic and logical operations at high speeds.

Now, considering that a plurality of targets exist at different relative distances from the FM radar system within a monitoring area of the radar system, we can obtain from the radar system body 1, a range signal S in which are mixed a plurality of signals each having a frequency corresponding to the relative distance to one of the targets and an amplitude proportional to the reflected wave from the one target.

Figure 3:
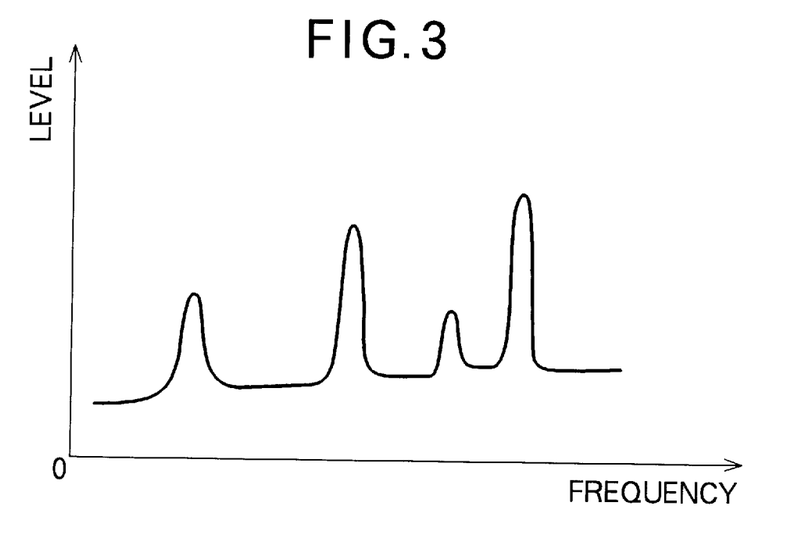
FIG. 3 is a graph showing a frequency spectrum characteristic or a range (distance) signal outputted from the radar system body when a plurality of targets exist.

In this instance, the frequency spectrum of the range signal S contains a plurality of frequency components, for example, as shown in FIG. 3 in which the number of the targets is four.

In this case, a beat signal is frequency-analyzed with the result that a plurality of peak frequencies are obtained. In each of the frequency rise section and the frequency fall section of the FM signal, the peak frequencies are arranged in the order of magnitude. Then, the peak frequencies in the frequency rise section and the peak frequencies in the frequency fall section are paired according to the arranged order to execute correction of the spectrum level, so as to obtain a range (distance) to each of the targets. The peak frequency pairing may be achieved using a technique disclosed in Japanese Patent Laid-opening Publication No. HEI 5-142337 previously mentioned.

Figure 4:
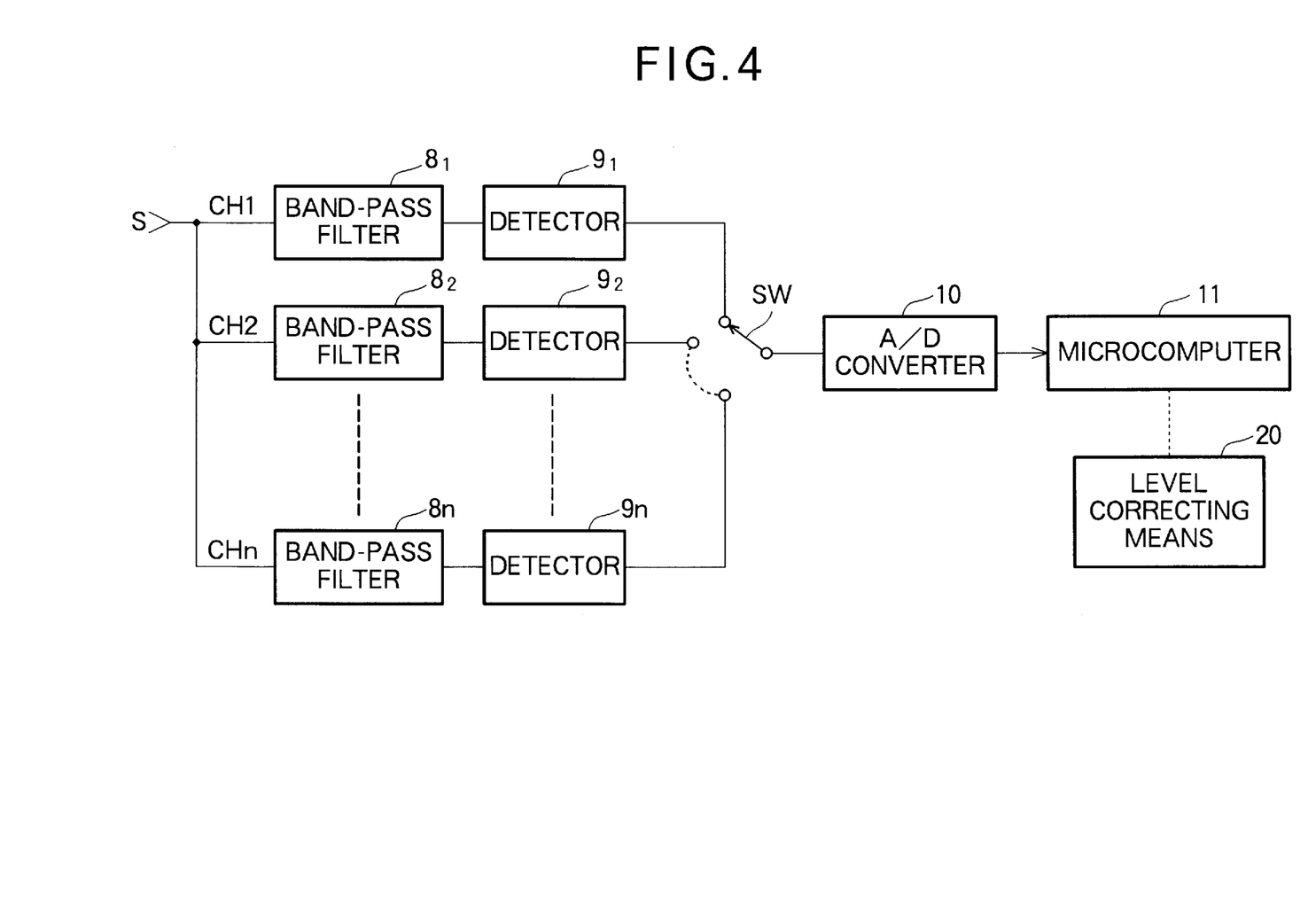
FIG. 4 is a block diagram showing a basic arrangement used for enabling the detection of the plural targets separately from one another.

FIG. 4 shows an arrangement that can be used for the frequency analysis of the range signal S.

The arrangement includes a plurality of parallel connected band-pass filters $8_1$–$8n$ each having a single transmission band corresponding to one of a plurality of divided frequency bands or channels $CH_1$–$CHn$ allocated to each of a plurality of frequency bands divided from the overall frequency range of the range signal S, and a plurality of detectors $9_1$–$9n$ each connected in series with a corresponding one of the band-pass filters $8_1$–$8n$ for detecting the output from the corresponding band-pass filter $8_1$–$8n$. The outputs from the respective detectors $9_1$–$9n$ are taken or read in succession through an A/D converter 10 into a microcomputer 11 in accordance with the switching action of a selector switch SW. The microcomputer 11 executes a judgment of the level using a preset threshold, so as to determine whether or not a target exists within a range (distance) corresponding to the frequency band of each of the channels $CH_1$–$CHn$. With this level judgment, the plural targets existing in a monitoring area of the FM radar system can be detected separately, with their respective relative distances associated therewith.

The level correcting means 20 associated with the microcomputer 11 operates in the same manner as previously described with reference to FIGS. 12A and 12B so that a spectrum level of the range signal S which is a peak in a frequency rise section of the FM signal is corrected into a spectrum level obtained when the beat signal is amplified with no Doppler shift involved therein, on the basis of the ratio of an amplification factor of the amplifier 7 (FIG. 2) at a peak frequency of the peak spectrum level to an amplification factor of the amplifier 7 at a mean value of the peak frequency in the frequency rise section and a peak frequency in the frequency fall section.

Description will now be given of a principle used to remove noise components, such as clutter, load surface reflection and so forth.

Figure 5:
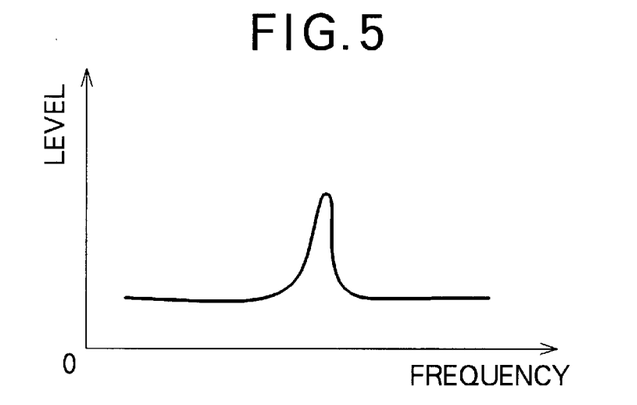
FIG. 5 is a graph showing an example of a frequency spectrum characteristic created by a reflected wave from a real target.
Figure 6:
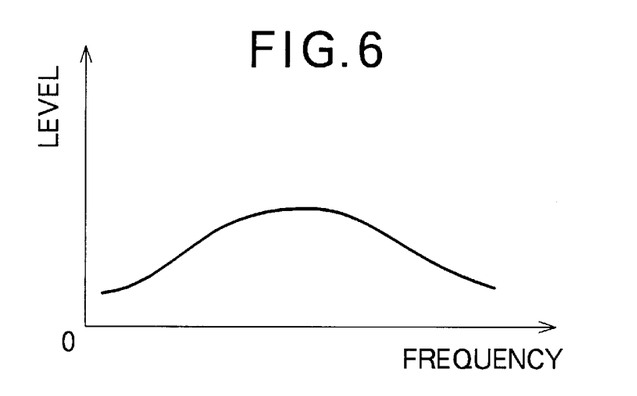
FIG. 6 is a graph showing an example of a frequency spectrum characteristic created by a reflected wave from a flat road surface.

The range signal S outputted from the radar system body 1 (FIG. 2) has a spectral distribution having a relatively sharp pulse-like form, as shown in FIG. 5, when it is originated from a reflected wave from a target O itself. On the other hand, when the range signal S is originated from a reflected wave from a flat road surface, it has a spectral distribution like a gently-sloped hill-like form extending over a relatively wide frequency range, as shown in FIG. 6. The latter-mentioned spectral distribution is substantially constant irrespective of the nature of roads, and so if output data from the amplifier 7 (FIG. 2) collected channel by channel from the reflected wave from the road surface is previously stored in the internal memory of the microcomputer 11 (FIG. 4), we will be able to effectively suppress or attenuate an adverse effect of the road surface reflection by way of an arithmetic operation executed in the microcomputer 11 to subtract from output data created about each channel on the basis of the range signal S, that part of the prestored data which is collected about a road surface reflection component of a corresponding one channel.

Since the relative velocity of a moving target with respect to a road or ground surface increases with the velocity of the moving target itself, it is further possible to previously determine a set of noise components corresponding to expected or potential velocities of the moving target itself and store them in the memory in the microcomputer 11. By using the data on the noise components, the noise removing process is performed in a condition closely linked with the velocities of the moving target. This process will provide an additional improvement in the detection accuracy.

Figure 7:
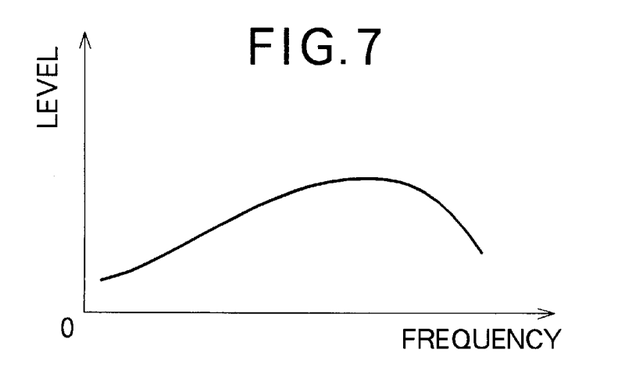
FIG. 7 is a graph showing an example of a frequency spectrum characteristic created by a reflected wave from an uphill road surface or from clutter.

A reflected wave from the surface of an uphill road, or a reflected wave from floating particles of rain or snow (clutter) received during transmission of an FM wave with an extremely high carrier frequency creates a spectral distribution having a relatively gently sloped hill-like form, as shown in FIG. 7. This spectral distribution appears to be different in characteristics from the spectral distribution of FIG. 5 resulting from a reflected wave from an actual target O.

Accordingly, the microcomputer 11 may be designed such that the difference (or the ratio) between a mean value of the data about all of the frequency channels and part of the data concerning each individual frequency channel, and the difference (or the ratio) between respective pieces of data concerning adjacent ones of the channels are calculated; and if the results of calculation exceed a preset threshold, they are judged to be resulting from detection of a real target, and alternately if the results of calculation are less than the preset threshold, they are judged to be noises caused by flutter and so forth, the noises being thereafter subjected to a noise removing process also performed by the microcomputer 11.

The foregoing noise component removing process is preferably performed before the Doppler shift correcting process achieved by the level correcting means 20.

Description will now be given of a principle used for the detection of a direction to the target.

Figure 8:
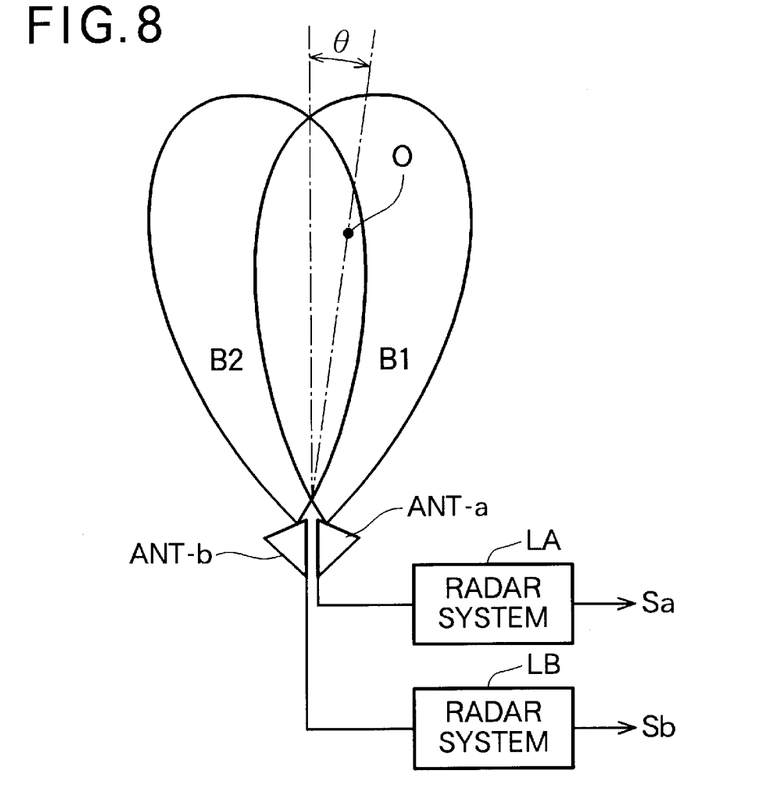
FIG. 8 is a block diagram showing a basic arrangement used for the detection of a direction to a target using two radar systems.

Referring to FIG. 8, it can be understood that two radar systems LA, LB have respective antennas ANT-a, ANT-b from which two beams are radiated in an overlapping state. Each of the radar systems LA, LB, upon detection of a target O existing in an overlapping area of the two beams, generates a radar output signal Sa, Sb having a level $1a$, $1b$. It is generally known that when the ratio of the difference between the two output signal levels to the sum of the two output signal levels, $(1a-1b)/(1a+1b)$, is represented by F, there is a certain relationship between the value of F and the directional angle θ of the target O, as represented by an S-shaped curve shown in FIG. 9.

Given that the relationship between F and θ is previously determined by measurement and the F-θ characteristic is stored in the internal memory of the microcomputer 11 (FIG. 4), a direction angle θ of a target O is determined by calculating an F value from the level of each of the output signals Sa, Sb generated when both radar systems LA, LB detect the same target O.

Even when a plurality of targets exist in the overlapping area of the beams B1, B2 of the respective radar systems LA, LB, directions to the respective targets can be detected separately.

Figure 10:
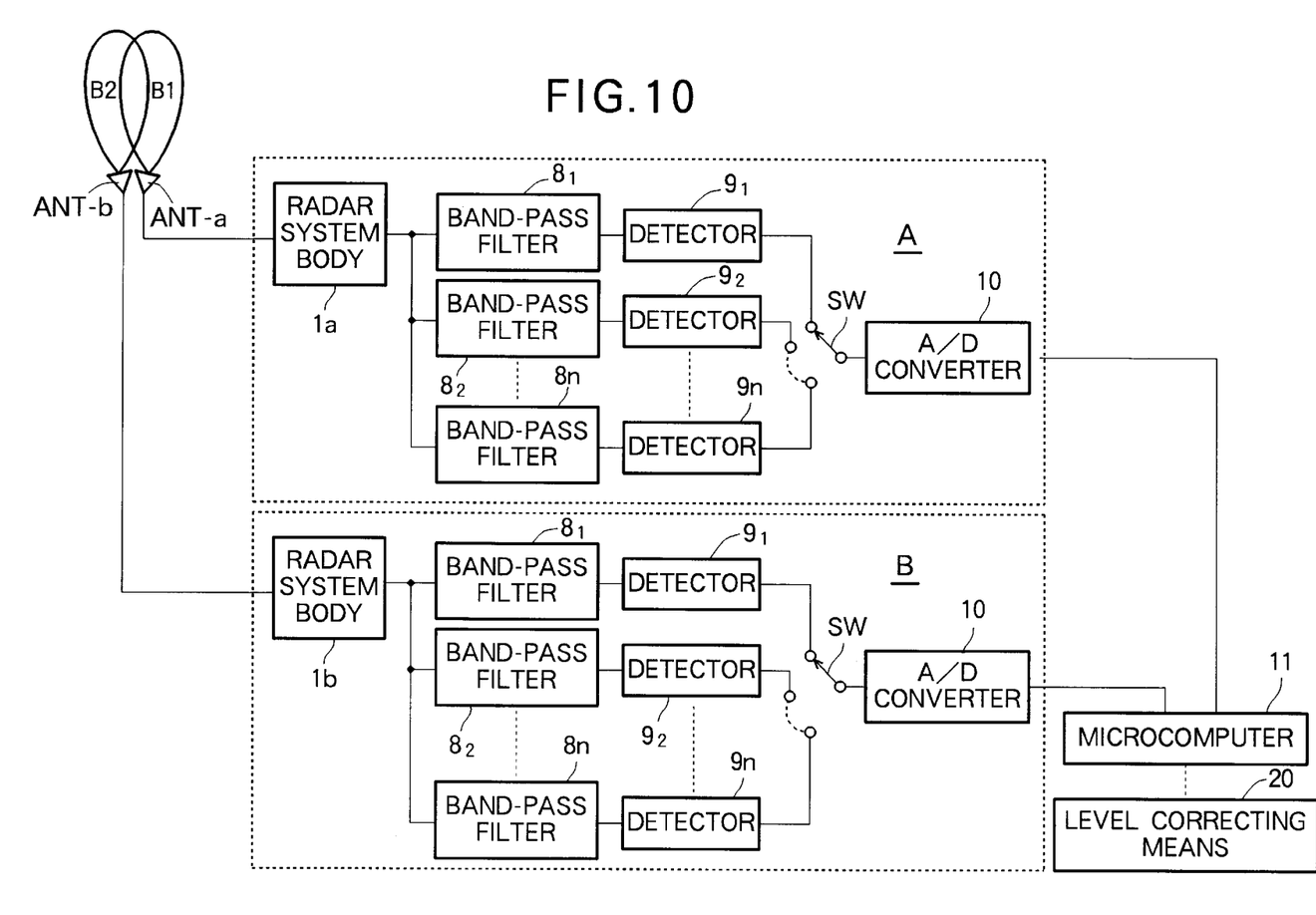
FIG. 10 is a block diagram showing an FM radar system system employing the arrangement shown in FIG. 4 according to the present invention.

FIG. 10 shows a fundamental arrangement used for realizing the detection of plural targets separately from one another simultaneously with the detection of directions to the respective targets.

The illustrated arrangement generally comprises two of the FM radar system shown in FIG. 4, and a single microcomputer 11 used commonly by the two FM radar systems A and B. The radar systems A, B are disposed in tandem and have an ability to detect plural targets separately from one another. They have respective beam radiating directions designed such that a beam B1 radiating from an antenna ANT-a of a radar system body $1a$ of one FM radar system A overlaps with a beam B2 radiating from an antenna ANT-b of a radar system body $1b$ of the other FM radar system B.

Band-pass filters $8_1$–$8n$ of the FM radar system A each have the same frequency band as a corresponding one of band-pass filters $8_1$–$8n$ of the FM radar system B. The microcomputer 11 incorporates therein a level correcting means 20 which is the same as the one shown FIG. 4.

In operation of this arrangement, the radar system body 1a is set in an operating condition (while keeping the radar system body 1b in an inoperating condition) and an output signal is taken or read channel by channel into the microcomputer 11 to execute detection of any target.

Then, the radar system body 1b is placed in the operating condition (while the radar system body 1a is kept in the inoperating condition) to perform detection of any target by taking or reading an output signal channel by channel into the microcomputer 11.

The microcomputer 11 then finds out by calculation every channel where a target is detected by both radar systems A, B.

Subsequently, with respect to each of the detected channels the level of the output signal is corrected by the level correcting means 20 into a level which is obtained when the beat signal is amplified in a condition free from Doppler shift caused due to the velocity of the target.

Based on the corrected level, an F value is calculated by the microcomputer 11 in the manner previously described and, thereafter, according to the calculated F value, a corresponding θ value is read out from a table previously stored in an internal memory of the microcomputer 11, thereby determining a direction angle of the target at the detected channel.

In this instance, a range (distance) to the detected target can be also obtained according to the number of the channel where the target is detected. In the case where there are two or more channels each of which indicates detection of the same target by both radar systems A, B, this means that two or more targets are detected at different ranges (distances) from the radar system. In this case, a process is performed such that with respect to each of the detected same channel pairs of the two radar systems A, B, an F value is determined to find out by calculation a direction angle of the target. Thus, directions to the respective targets can be determined separately from one another.

Referring back to FIG. 1, there is shown an FM radar system in which the principles of the present invention are embodied. The radar system has only one radar system body 1 for simplification of the overall structure, while it is provided with an antenna switch ANT-SW operable to switch or change over two antennas ANT-a and ANT-b so that two beams B1, B2 are radiated alternately from the antennas ANT-a, ANT-b.

Figure 1:
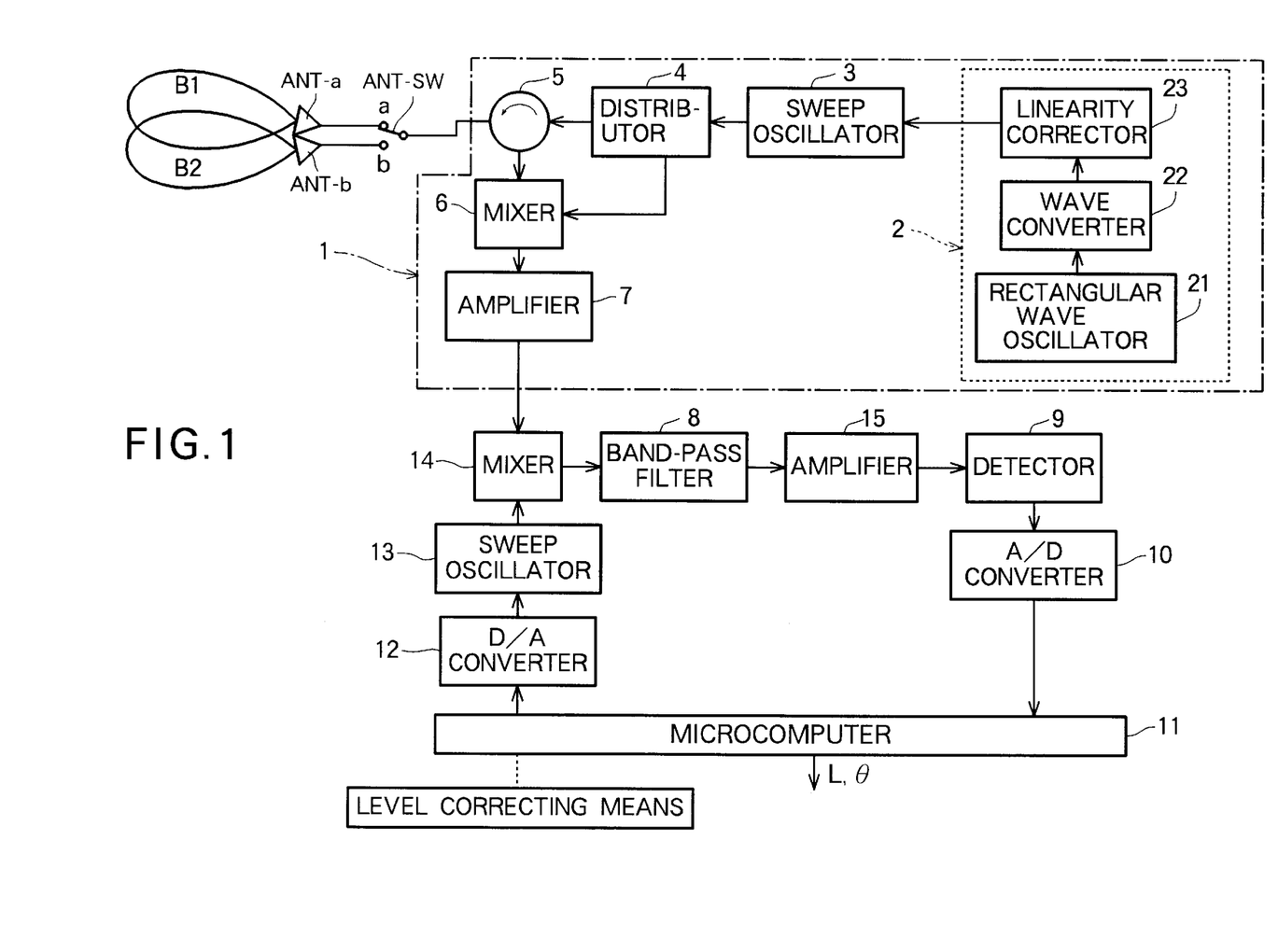
FIG. 1 is a block diagram showing an FM radar system according to an embodiment of the present invention.

The FM radar antenna system includes a triangular wave generator 2 composed of a rectangular wave generator 21 designed to generate a rectangular wave signal at a frequency of 50 kHz, a waveform converter 22 for converting the rectangular wave signal into a triangular wave signal, and a linearity correcting circuit or corrector 23 for correcting the triangular wave signal such that the oscillation frequency at a sweep oscillator 3 varies linearly. The sweep oscillator 3 generates a frequency modulated (FM) wave signal having a sweep width of 400 MHz.

In place of the group of band-pass filters $8_1$–$8n$, the group of detectors $9_1$–$9n$, and the selector switch SW, there are provided a sweep oscillator 13 which successively generates frequency signals divided into multiple stages according to corresponding channel allocation signals given successively from a microcomputer 11 through a digital-to-analog (D/A) converter 12, a mixer 14 which mixes the sweep oscillation frequency signals and a range signal S outputted from the radar system body 1, a band-pass filter 8 which filters the output signal from the mixer 14, and a detector 9 which detects the output from the band-pass filter 8 which has passed an amplifier 15.

In operation of the FM radar system of the foregoing construction, first, the antenna switch ANT-SW is operated, under the control of the microcomputer 11, to close a circuit on the side of a contact a whereupon a beam B1 is radiated in a predetermined direction from the antenna ANT-a.

In this instance, if the target detection range (distance) of the radar system is 1 to 100 m, the frequency range of the range signal S is 0.267 to 26.7 MHz. The microcomputer 11 supplies a demand (channel allocation signal) to the D/A converter 12 to allocate a channel so that a direct current (DC) voltage signal matched with the allocated channel is supplied to the sweep oscillator 13.

The sweep oscillator 13, in accordance with the channel allocation signal, oscillates a total of 99 frequency signals that are divided at every unit frequency interval of 267 kHz within a frequency range of 31.3 to 57.466 MHZ.

The frequency signals outputted from the sweep oscillator 13 and the range signal S are mixed together by the mixer 14. The mixed output from the mixer 14 is filtrated by the bandpass filter 8 having a pass-band (transmission frequency band) of 57.733 to 58.0 MHz. The filtered signal is amplified by the amplifier 15 and subsequently detected by the detector 9. The detected signal (DC voltage signal) is subjected to the analog-to-digital (A/D) conversion at an A/D converter 10 and, thereafter, it is taken or read into the microcomputer 11.

During that time, the microcomputer 11 changes the channel allocation given to the D/A converter 12, successively from 1 to 99 and, at the same time, it reads successive pieces of output data from the A/D converter 10 channel by channel and stores them in succession in the internal memory.

Figure 11:
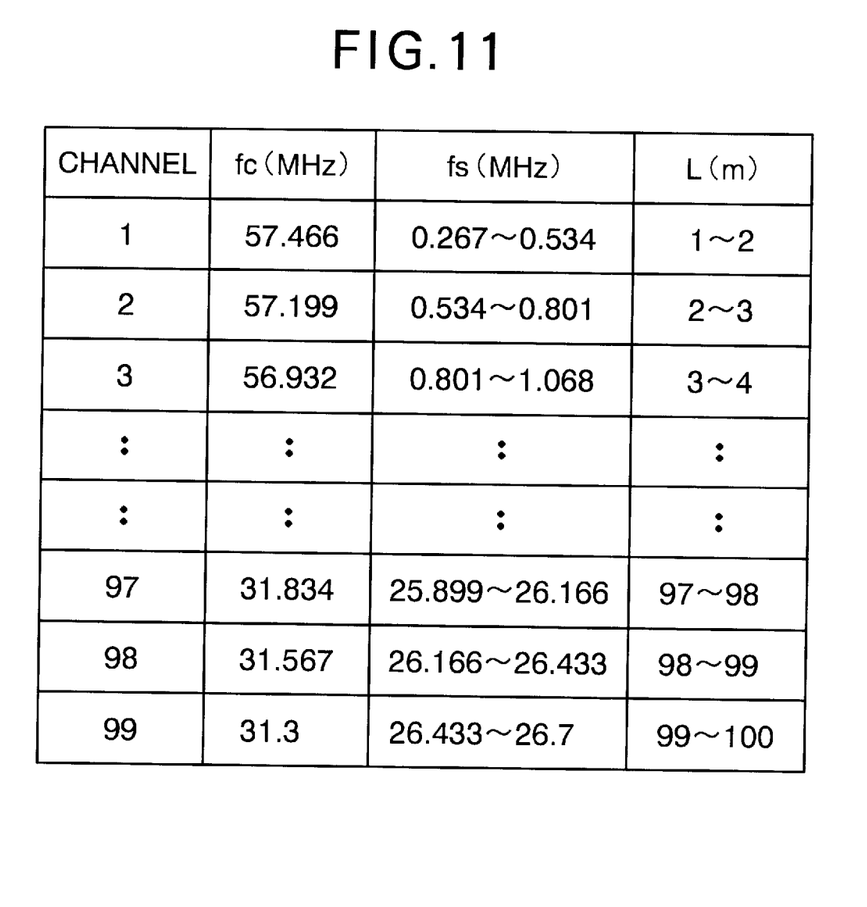
FIG. 11 is a table showing the relationship between the oscillation frequency of a sweep oscillator, the frequency range of a range (distance) signal, and the range (distance) to a target that are tabulated channel by channel.

FIG. 11 is a table showing the relationship between the oscillation frequency fc of the sweep oscillator 13, the frequency range fs of the range signal S, and the range L to the object that are tabulated for each channel.

The foregoing operation is taken first with respect to the frequency rise section of the FM signal and, upon completion of this operation, the same operation is repeated with respect to the frequency fall section of the FM signal. Consequently, successive pieces of data each concerning one of the channels 1 to 99 are stored in the internal memory in the same manner as described above.

Then, the microcomputer 11 instructs the antenna switch ANT-SW to close a circuit on the side of a contact b to thereby cause a beam B2 to be radiated from the antenna ANT-b toward a predetermined direction and, at the same time, the microcomputer 11 successively collects pieces of data concerning respective ones of the channels 1 to 99 and stores them in the internal memory in the manner previously described.

When the foregoing operation, which is taken first with respect to the frequency rise section of the FM signal, completes, successive pieces of data each concerning one of the channels 1 to 99 are collected with respect to the frequency fall side of the FM signal and the collected data pieces are stored in the internal memory of the microcomputer 11 in the same manner as described above.

Thus, the data about two groups of 99 channels (channel #1 to channel #99) of the antennas ANT-a, ANT-b have been collected and stored. Subsequently, the microcomputer 11 executes a noise-removing process for each of the two groups so that noise components such as road surface reflection, clutter and so forth are in the manner described above with reference to FIGS. 4 through 7. Thereafter, the microcomputer 11 executes detection of a target for each channel to thereby find out or select every channel which is in a condition indicative of the detection of one target.

Figure 9:
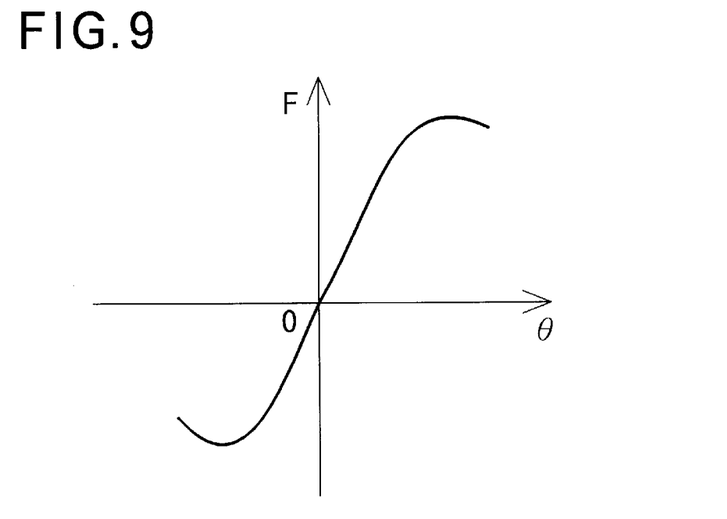
FIG. 9 is a graph showing the F-θ characteristic of the radar system.

Then, with respect to the selected channel or channels, the corrected data (about the spectrum levels) in the two groups are used in the microcomputer 11 to calculate an F value in order to find out a corresponding direction angle θ to the target, in the manner previously described with reference to FIGS. 8 and 9. Finally, the microcomputer 11 outputs data on the range (distance) L to the detected target and data on the directional angle θ of the detected target to an external display unit (not shown), for example.

As described above, the beat signal is subjected to the frequency analysis in order to obtain a spectral distribution of the beat signal at every unit frequency interval forming one of the 99 channels (channel #1 to channel #99).

In order to obtain a relative distance of a target, the microcomputer 11 may further comprise a maximum spectrum detector, a level centroid detector and a distance detector that are the same as those shown in Japanese Patent Laid-open Publication No. HEI 7-128440 previously described. In this instance, the relative distance of the target is determined according to the frequency of the maximum spectrum detected by the maximum spectrum detector. A further possible modification is that the frequency of a level centroid is taken to be a peak frequency, and a spectrum level at this peak frequency is calculated from a curve approximating a spectral distribution by a quadratic curve. The calculated spectrum level is used for the correction of the spectrum level. On the assumption that those spectral levels at frequencies around a frequency corresponding to a relative distance of the target are in a normal distribution, the calculation of the spectrum level at the peak frequency may be achieved by determining from discrete data, a spectrum level at the centroid frequency (which is a level of the vertex of the normal distribution). As an alterative, a general spectral distribution around the frequency corresponding to the relative distance of the target may be previously determined by experiments, for example, and discrete spectral data of a beat signal is compared with the predetermined spectral distribution to determine a spectrum level at the centroid frequency. Another alternation is that since the sum of spectrum levels of the discrete spectral data taken around the frequency corresponding to the relative distance of the target is generally in approximate proportional to a spectrum level of the vertex of a spectral distribution, a spectrum level at the centroid frequency can be obtained from a value of the sum of spectrum levels taken within a predetermined frequency width around the frequency of a maximum spectrum.

By the techniques described above, a certain improvement in the spectrum level correction accuracy can be attained as compared to a technique in which spectrum levels are corrected by setting the peak frequency at each channel within a predetermined frequency range (for example, by setting the peak frequency at channel #3 (CH3) shown in FIG. 11 at 0.801 MHz, 1.068 MHz or a median number therebetween).

Obviously, various minor changes and modifications are possible in the light of the above teaching. It is to be understood that within the scope of the appended claims the present invention may be practiced otherwise than as specifically described.

What is claimed is:

1. An FM radar system in which an FM signal is transmitted to a target and a signal reflected by the target is received so that the position of the target is detected on the basis of a beat signal obtained by mixing together the received signal and a signal related to the transmitted signal, wherein the improvement comprising:

(a) an amplifier for amplifying the beat signal at an amplification factor varying with the frequency; and (b) means for correcting a spectrum level of an amplified signal from said amplifier or a spectrum level of a signal generated based on said amplified signal into a spectrum level obtained when the beat signal is amplified without involving Doppler shift caused by a velocity of the target relative to said FM radar system, thus enabling the detection of the position of the target to be performed on the basis of the spectrum level corrected by said correcting means.

2. The FM radar system according to claim 1, wherein said amplifier amplifies the beat signal at an amplification factor proportional to the fourth power of the frequency.

3. The FM radar system according to claim 1 wherein said FM radar system is an FM-CW radar system which radiates an FM signal frequency-modulated by a triangular wave, and wherein said correcting means operates to correct a spectrum level at which said spectrum level of said amplified signal from said amplifier or said spectrum level of said signal generated based on said amplified signal forms a peak in a frequency rise section or a frequency fall section of said FM signal, into said spectrum level obtained when said beat signal is amplified without involving Doppler shift, on the basis of a first amplification factor of said amplifier at a frequency of said peak and a second amplification factor of said amplifier at a mean value of two peak frequencies in said frequency rise section and said frequency fall section.

4. The FM radar system according to claim 2 wherein said FM radar system is an FM-CW radar system which radiates an FM signal frequency-modulated by a triangular wave, and wherein said correcting means operates to correct a spectrum level at which said spectrum level of said amplified signal from said amplifier or said spectrum level of said signal generated based on said amplified signal forms a peak in a frequency rise section or a frequency fall section of said FM signal, into said spectrum level obtained when said beat signal is amplified without involving Doppler shift, on the basis of a first amplification factor of said amplifier at a frequency of said peak and a second amplification factor of said amplifier at a mean value of two peak frequencies in said frequency rise section and said frequency fall section.

5. The FM radar system according to claim 3, wherein the corrected spectrum level is determined by multiplying said spectrum level forming said peak in the frequency rise section or frequency fall section, by the reciprocal of the ratio of said first amplification factor of said amplifier to said second amplification factor of said amplifier.

6. The FM radar system according to claim 1, wherein said correcting means corrects said spectrum level of said amplified signal from said amplifier or said spectrum level of said signal generated based on said amplified signal into said spectrum level obtained when said beat signal is amplified without involving Doppler shift caused due to the velocity of the target, after a noise component involved in said beat signal is removed.

7. The FM radar system according to claim 1, wherein said radar system radiates at least two beams successively in the basis of spectrum levels of respective amplified signals obtained when said two beams are successively radiated in said overlapping state, or spectrum levels of respective signals generated based on said amplified signals.

8. An FM radar system in which an FM signal is transmitted to a target and a signal reflected by the target is received so that the position of the target is detected on the basis of a beat signal obtained by mixing together the received signal and a signal related to the transmitted signal, the improvement comprising:

(a) an amplifier for amplifying the beat signal at an amplification factor varying with the frequency of the beat signal; and (b) a level corrector for correcting a spectrum level of an amplified signal from said amplifier or a spectrum level of a signal generated based on said amplified signal into a spectrum level obtained when the beat signal is amplified without involving Doppler shift caused by a velocity of the target relative to said FM radar system, thus enabling the detection of the position of the target to be performed on the basis of the spectrum level corrected by said level corrector.

9. The FM radar system according to claim 8 wherein said amplifier amplifies the beat signal at an amplification factor proportional to the fourth power of the frequency.

10. The FM radar system according to claim 8 wherein said FM radar system is an FM-CW radar system which radiates an FM signal frequency-modulated by a triangular wave, and wherein said level corrector operates to correct a spectrum level at which said spectrum level of said amplified signal from said amplifier or said spectrum level of said signal generated based on said amplified signal forms a peak in a frequency rise section or a frequency fall section of said FM signal, into said spectrum level obtained when said beat signal is amplified without involving Doppler shift, on the basis of a first amplification factor of said amplifier at a frequency of said peak and a second amplification factor of said amplifier at a mean value of two peak frequencies in said frequency rise section and said frequency fall section.

* * * * *